United States Patent
Prokopec et al.

(10) Patent No.: US 10,261,765 B1
(45) Date of Patent: Apr. 16, 2019

(54) ENHANCING PROGRAM EXECUTION USING OPTIMIZATION-DRIVEN INLINING

(71) Applicant: ORACLE INTERNATIONAL CORPORATION, Redwood Shores, CA (US)

(72) Inventors: Aleksandar Prokopec, Zurich (CH); Thomas Wuerthinger, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/917,482

(22) Filed: Mar. 9, 2018

(51) Int. Cl.
  *G06F 9/45* (2006.01)
  *G06F 8/41* (2018.01)
  *G06F 8/30* (2018.01)

(52) U.S. Cl.
  CPC ............ *G06F 8/4443* (2013.01); *G06F 8/30* (2013.01); *G06F 8/433* (2013.01); *G06F 8/443* (2013.01); *G06F 8/4441* (2013.01)

(58) Field of Classification Search
  CPC ...... G06F 8/443; G06F 8/4441; G06F 8/4443; G06F 11/3696
  See application file for complete search history.

(56) References Cited

U.S. PATENT DOCUMENTS

| | | | | |
|---|---|---|---|---|
| 2005/0097528 A1* | 5/2005 | Chakrabarti | ......... | G06F 8/4441 717/140 |
| 2005/0262491 A1* | 11/2005 | Gu | ............ | G06F 8/4443 717/151 |
| 2010/0198799 A1* | 8/2010 | Krishnan | ............ | G06F 11/3696 707/702 |
| 2012/0042306 A1* | 2/2012 | Kawahito | ............ | G06F 8/443 717/151 |
| 2015/0268941 A1* | 9/2015 | Nakaike | ............ | G06F 8/4443 717/152 |

OTHER PUBLICATIONS

Duboscq, G. et al., "An Intermediate Representation for Speculative Optimization in a Dynamic Compiler", Proceedings of the 7th ACM workshop on Virtual Machines and Intermediate Languages, VMIL '13, pp. 1-10, Oct. 28, 2013, New York, NY, USA (10 pages).

(Continued)

*Primary Examiner* — Tuan A Vu
(74) *Attorney, Agent, or Firm* — Ferguson Braswell Fraser Kubasta PC

(57) ABSTRACT

Optimizing program execution includes performing, to obtain a first expanded call graph, a first expansion of an initial call graph. The first initial call graph is defined for a program that includes a root method, a first child method, and a second child method. Based on an analysis of the first expanded call graph, the first child method, corresponding to a node in the first expanded call graph, is inlined into the root method. An optimization operation is performed in response to inlining the child method, and the first expanded call graph is updated based on the optimization operation. A second expansion of the updated call graph is performed. Based on an analysis of the second expanded call graph, the second child method is inlined into the root method, where the second child method corresponds to a node in the second expanded call graph. Compilation of the program is completed.

20 Claims, 14 Drawing Sheets

(56) References Cited

OTHER PUBLICATIONS

Asher, Y. B. et al., "Agressive Function Inlining: Preventing Loop Blockings in the Instruction Cache", International Conference on High-Performance Embedded Architectures and Compilers, HiPEAC, pp. 384-397, Berlin, Beidelberg, Jan. 28-29, 2008 (15 pages).
Ayers, A. et al., "Aggressive Inlining", Proceedings of the ACM SIGPLAN 1997 Conference on Programming Language Design and Implementation, PLDI '97, pp. 134-145, New York, NY, USA, Jun. 16-18, 1997 (12 pages).
Arnold, M. et al., "A Comparative Study of Static and Profile-Based Heuristics for Inlining", Proceedings of ACM SIGPLAN Workshop on Dynamic and Adaptive Compilation and Optimization, Jan. 2000 pp. 52-64 (13 pages).
Jagannathan, S. et al., "Flow-directed Inlining", Proceedings of the ACM SIGPLAN 1996 Conference on Programming Language Design and Implementation, PLDI '96, pp. 193-205, New York, NY, USA, May 21-24, 1996 (13 pages).
Jones, S. P. et al., "Secrets of the Glasgow Haskell Compiler Inliner", Microsoft Research Ltd, Cambridge, Sep. 1, 1999 (18 pages).
McFarling, Scott, "Procedure Merging with Instruction Caches", Proceedings of the ACM SIGPLAN 1991 Conference on Programming Language Design and Implementation, PLDI '91, New York, NY, USA, Jun. 26-28, 1991 (23 pages).
Chang, P. P. et al., "Profile-Guided Automatic Inline Expansion for C Programs", Software-Practice & Experience, vol. 22, Issue 5, May 1992 (31 pages).
Click, C. et al., "A Simple Graph-Based Intermediate Representation" Papers from the 1995 ACM SIGPLAN Workshop on Intermediate Representations, IR '95, pp. 35-49, New York, NY, USA, Jan. 22, 1995 (15 pages).
Stadler, L. et al., "Partial Escape Analysis and Scalar Replacement for Java", Proceedings of Annual IEEE/ACM International Symposium on Code Generation and Optimization, CGO '14, pp. 165-174, New York, NY, USA, Feb. 15-19, 2014 (10 pages).
Dean, J. et al., "Towards Better Inlining Decisions Using Inlining Trials", Proceedings of the 1994 ACM Conference on LISP and Functional Programming, LFP ' 94, pp. 273-282, Jun. 27-29, 1994. New York, NY, USA (10 pages).

\* cited by examiner

```
1    int half(int x) {
2            return x / 2;
3    }
4
5    boolean collatz(int n) {
6            if (n == 1)
7                    return true;
8            else if (n < 1)
9                    return false;
10           else if (n%2==1)
11                   return collatz(3*n+1);
12           else
13                   return collatz(half(n));
14   }
15
16   int main(String[] args)  {
17           if (collatz(2)) return 0;
18           LOG.error("Unexpected!");
19           return 1;
20   }
```

10,261,765 B1

ENHANCING PROGRAM EXECUTION USING OPTIMIZATION-DRIVEN INLINING

BACKGROUND

When a computer program is written, the computer program is written as source code. A compiler is a software program that translates the source code into object code, byte code, or assembly code. Object code or byte code or assembly can be executed directly by a computer processor or a virtual machine. During compilation, the compiler may perform various optimizations. For example, optimizations may reduce the number of instructions executed by a computer processor. By performing the optimizations, the compiler is able to provide more efficient use of the computer processor.

One way to benefit from the information spread across a call graph data structure and to apply additional optimizations to the computer program is to replace the function calls with the respective function bodies, a transformation called inline expansion or inlining. Most compilers rely heavily on inlining, since inlining a function body is fast, enables other optimizations, and does not require a whole-program analysis.

Although replacing a call-site (e.g., the location, or line of code, where the function is called) with the body of the callee function is a simple transformation, deciding which functions to inline is in practice difficult. Consequently, in many compilers, inlining is based on hand-tuned heuristics and proverbial rules of thumb.

SUMMARY

In general, in one aspect, one or more embodiments relate to a method, system, and computer readable medium for optimizing program execution of a program. The system includes memory and computer processor configured to execute a compiler stored in memory. The compiler for causing the computer processor to optimize the program execution. The non-transitory computer readable medium comprises computer readable program code for optimizing the program execution. The optimizing of the program execution includes performing, to obtain a first expanded call graph, a first expansion of an initial call graph, the first expanded call graph including multiple nodes. The first initial call graph is defined for a program that includes a root method, a first child method, and a second child method. Based on an analysis of the first expanded call graph, the first child method is inlined into the root method. The first child method corresponds to a node of the multiple nodes in the first expanded call graph. An optimization operation is performed in response to inlining the child method, and the first expanded call graph is updated based on the optimization operation to obtain an updated call graph. The optimizing the program execution further includes performing, to obtain a second expanded call graph, a second expansion of the updated call graph. The second expanded call graph includes multiple nodes. Based on an analysis of the second expanded call graph, the second child method is inlined into the root method, where the second child method corresponds to a node in the second expanded call graph. Compilation of the program is completed.

DETAILED DESCRIPTION

Figure 1:
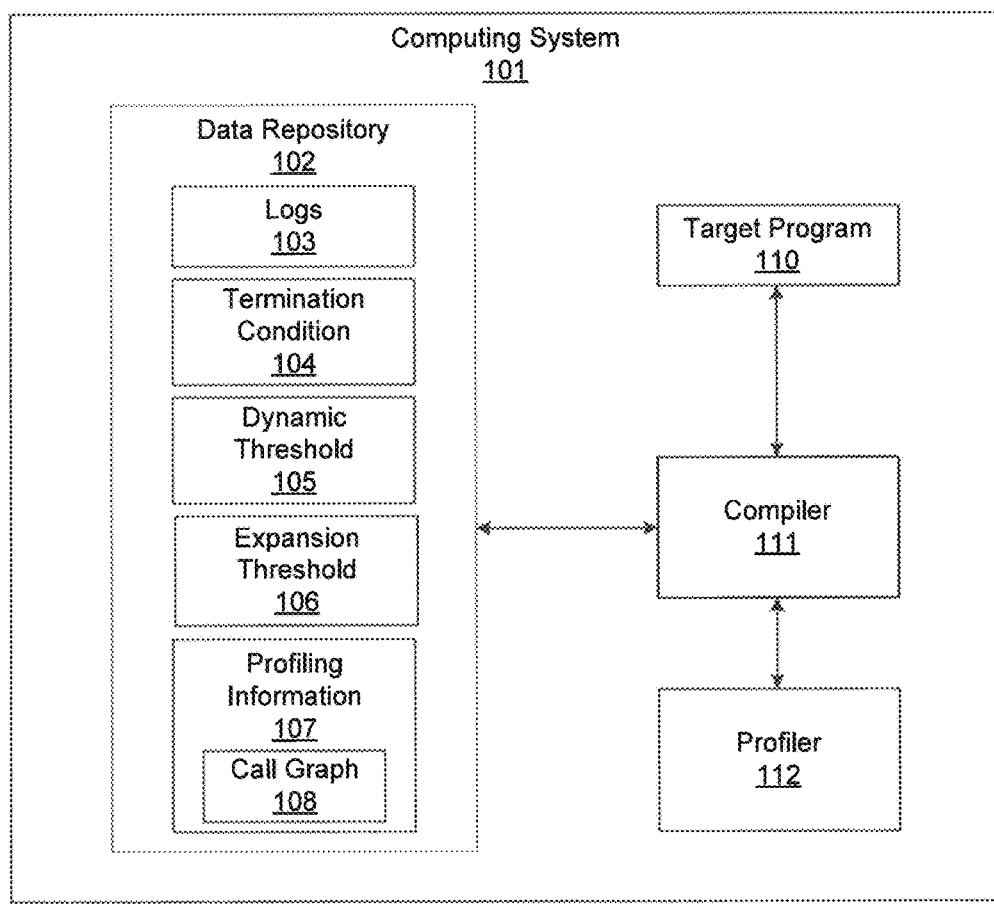
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the inventions relate to an inlining procedure based on several concepts. One is that the call graph exploration is incremental. The procedure partially explores the call graph during the expansion stage, then switches to the inlining stage. These two stages alternate until a termination condition is met. Further, embodiments of the invention relate to call graph exploration being prioritized using a ratio of the inlining benefit and the inlining cost of the candidate call-sites. Embodiments of the invention relate to inlining benefit, which is estimated by performing optimizations speculatively throughout the call graph, after replacing the function parameters with the concrete call-site arguments, and by relying on the profile information obtained during the prior execution of the program.

In one or more embodiments of the invention, cost-benefit analysis identifies call graph subcomponents that should be inlined together using a heuristic. Cost-benefit analysis is performed by analyzing if inlining the call-site increases the benefit-per-cost ratio of the caller. In one or more embodiments of the invention, inlining is budget-driven: the minimum benefit-per-cost ratio required for inlining grows dynamically with the amount of work performed by the invention.

FIG. 1 shows a system in accordance with one or more embodiments of the invention. As shown in FIG. 1, the system is a computing system (101), such as the computer system shown in FIGS. 8A and 8B, and described below. The computing system (101) includes a target program (110) is provided to the compiler (111), which invokes a profiler (112) to assist with creating a call graph (108). The compiler (111) executes on the computer system (101) to transform the provided target program (110) to bytecode or object code, or some other program representation. The profiler (112) analyzes dynamically the source code and identifies critical sections of the code.

The computing system (101) also includes a data repository (102), which stores the data used by or generated by the components of the computing system. For example, the data repository (102) may be a relational database, a hierarchical database, or any other form of repository of data. In one or more embodiments, the repository (102) is essentially the same as the repository shown and described in relation to the computing system in FIG. 8A.

Continuing with FIG. 1, the data repository (102) may include logs (103), a termination condition (104), a dynamic threshold (105), and expansion threshold (106), profiling information (107). Within the profiling information (107) is the call graph (108), which is a control flow graph representing the relationship between subroutines (or methods) in the target program (110). Using the expansion threshold (106) and the dynamic threshold (105), one or more embodiments proceed to evaluate whether to inline methods or not, depending on whether a certain termination condition (104) is met. The results of this activity are logged in the logs (103).

In one or more embodiments, the compiler (111) analyzes the methods of the target program (110). In one or more embodiments of the invention, the compiler (111) starts with a call graph consisting only of the root node (i.e. the compilation unit) and creates an expanded call graph. The expanded call graph is obtained by adding call graph nodes for callsites inside some nodes that are not yet associated with their own (i.e., the callsites' own) call graph nodes. In one or more embodiments, the compiler (111) then inlines, based on an analysis of the expanded call graph, one or more methods found within the target program (110) into a root method. The compiler (111) then performs an optimization operation in response to inlining the method. The compiler (111) then updates the expanded call graph based on the optimization operation to obtain an updated call graph. The following process may be repeated multiple times: the compiler (111) obtains an expanded call graph, and an expansion of the updated call graph. Then, the compiler (111) inlines, based on an analysis of the expanded call graph, the method into the root method. If certain termination conditions are met, the compiler (111) completes compilation of the target program (110). Details of these steps are shown and discussed in relation to FIG. 3.

Figure 2:
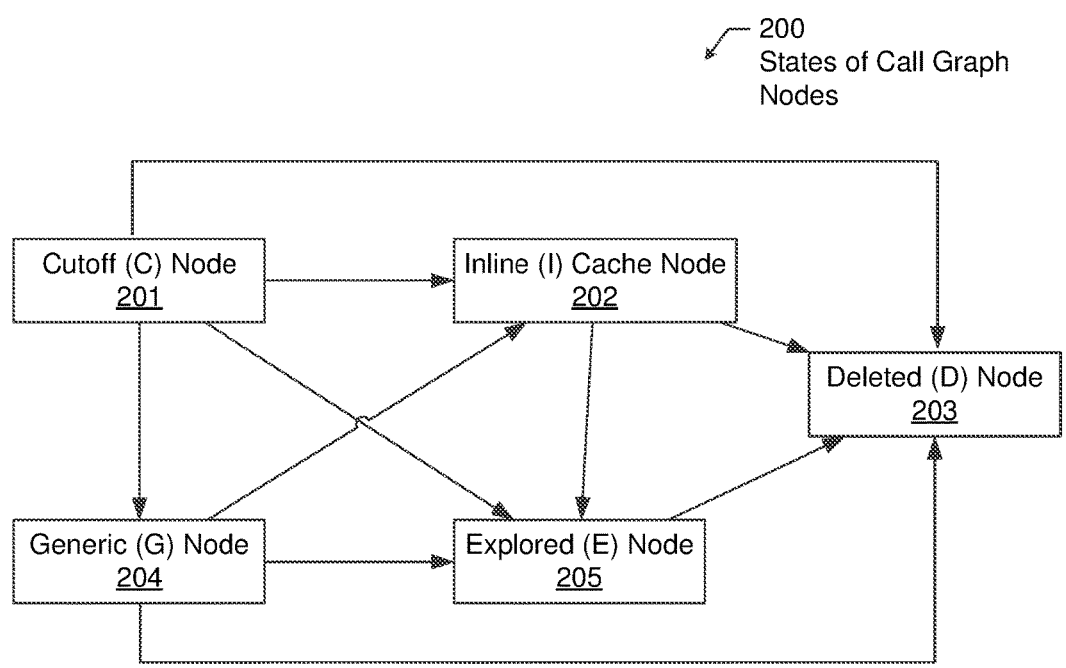
FIG. 2 shows a state diagram of call graph nodes in accordance with one or more embodiments of the invention.

In one or more embodiments, FIG. 2 shows the types and states of call graph nodes (200), which are elements of the call graph, used in this invention, including Cutoff (C) Node (201), Inline Cache (I) Node (202), Deleted (D) Node (203), Generic (G) Node (204), and Explored (E) Node (205). A Cutoff Node (201) represents a call to a function whose body has not been explored. An Inline Cache Node (202) represents calls that can dispatch to multiple known target functions. A Deleted Node (203) represents a call-site that was originally in the intermediate representation, but was removed by a optimization. A Generic Node (204) represents a call to a function that will nut be considered for inlining. An Explored Node (205) represents a call to a function whose body was explored. In one or more embodiments, the compiler evaluating methods of the target program uses the above-named nodes as part of its optimization.

FIGS. 3, 4, 5 and 6 show flowcharts in accordance with one or more embodiments of the invention. While the various steps in these flowcharts are presented and described sequentially, one of ordinary skill will appreciate that some or all the steps may be executed in different orders, may be combined or omitted, and some or all the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
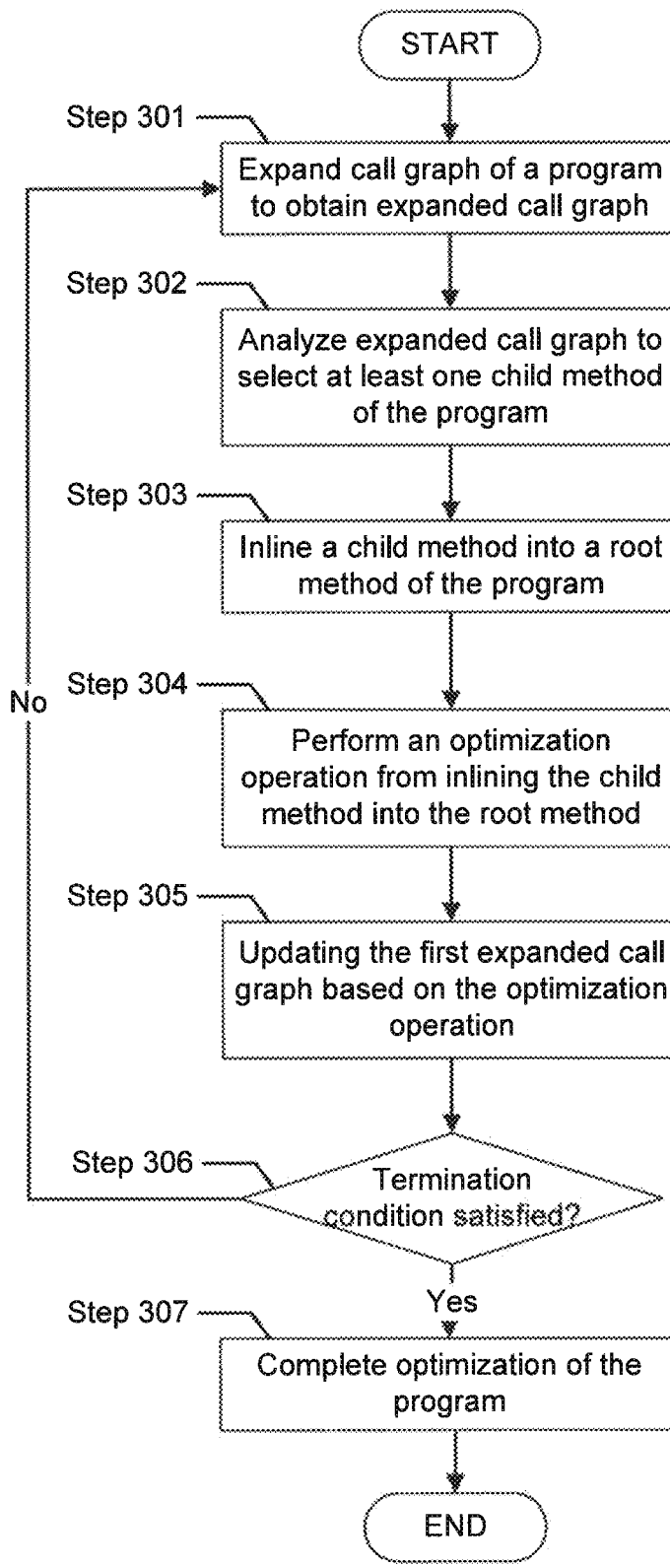
FIGS. 3, 4, 5, and 6 show flowcharts in accordance with one or more embodiments of the invention.

FIG. 3 shows a method for the overall process of one or more embodiments of the invention. In Step 301, the call graph of the program is expanded. The expand function repetitively calls the 'descend and expand' subroutine until the policy returns "true" from the subroutine that checks whether the expansion is completed.

The expand policy subroutine ensures that the queue data structure of each node initially contains the children of that node, sorted by the priority P. The priority can be computed as, but is not limited to, the value B/C, where B is the benefit of inlining that (and only that) specific node, and C is the code size increase resulting from inlining the node. The 'descend and expand' subroutine descends on one path in the call graph, by choosing a node with the highest priority, until reaching a cutoff node, and then expands that node. If the 'descend and expand' subroutine encounters an expanded node or an inline cache node, then the best child node is removed from the queue data structure, and the subroutine recursively calls itself for that child node. If the node returned from the recursive call is not null or has a non-empty queue, then the child node is placed back on the expansion queue of the current node. Before returning the current node, the update metric subroutine updates the metrics field. The metrics field contains various information about the relevant subtree of the call graph, including, but not limited to, total program size of all the call graph nodes in that subtree, or the number of cutoff nodes in that subtree. Otherwise, if the current node is a cutoff node (i.e. a leaf in the tree), then the expand subroutine is called on the policy object.

In one or more embodiments, the expand subroutine may return either null (indicating that the respective cutoff should not be considered in this round) or return a generic, expanded, or an inline cache node. In one or more embodiments, the expansion of the call graph begins at the request of a user of a computing device. In one or more embodiments, the expansion of the call graph begins as a part of scheduled functionality of a computing device. In one or more embodiments, the expansion of the call graph of the program begins as a result of being invoked by other software running on a computing device.

Step 302 analyzes the expanded call graph to select a child method of the program. Step 302 analyzes the expanded call graph to identify groups of methods in the call graph that should be inlined simultaneously. Simultaneously is at the same time, overlapping times, or immediately one after the other. Each group of methods is assigned a benefit and a cost value. In one or more embodiments, the analysis of the expanded call graph is designed to be executable by the compiler.

Step 303 inlines a child method into a root method of the program. In one or more embodiments, several groups of methods are inlined into the root method of the program in Step 303. A group of methods is a set of methods whose inlining improve program performance only if the methods in the set are inlined together, and can be inlined either entirely (if there is sufficient budget remaining), or not at all. In one or more embodiments, the inlining of a child method is designed to be executable by the compiler.

Step 304 performs an optimization operation for inlining the one or more child methods into the root method. In one or more embodiments, the optimization operation for inlining the child method into the root method is designed to be executable by the compiler.

Step 305 updates the expanded call graph based on the optimization operation. In one or more embodiments, the update of the expanded call graph based on the optimization operation is designed to be executable by the compiler.

Step 306 checks to determine whether the termination condition is satisfied. In one or more embodiments, if the termination is satisfied, the process continues to Step 307. In one or more embodiments, if the termination condition is not satisfied, the process returns to Step 301.

Step 307 completes the optimization of the program. In one or more embodiments, completion of the optimization of the program is designed to be executable by the compiler.

Figure 4:
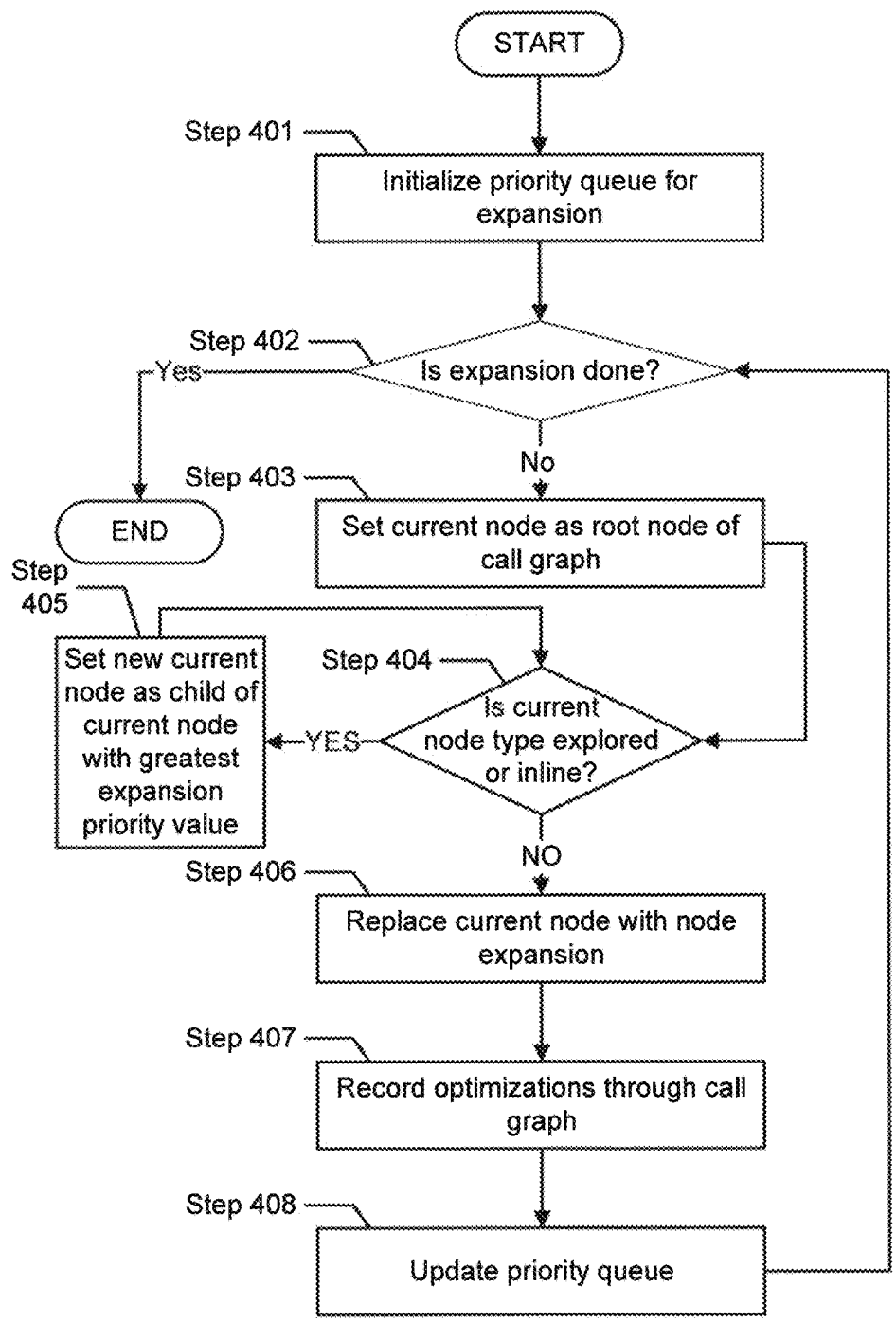

FIG. 4 shows the expansion part of one or more embodiments of invention. Any of the steps shown in FIG. 4 may be designed to be executed by the compiler. Initially, step 401 initializes priority queue for expansion of the call graph. The initial priority queue value is a function of the initial benefit and the cost size.

Step 402 the determines whether the expansion is completed. In one or more embodiments, if the expansion is completed, the process proceeds to the END. The expansion is completed either when there are no more cutoff nodes to expand, or according to a heuristic. A heuristic can be, but is not limited to, to check whether the benefit-per-cost ratio of the cutoff node exceeds the value $e\textasciicircum((\text{root-size}-C1)/C2)$, where root-size is the size of the root method, and C1 and C2 are empirically derived constants. In one or more embodiments, if the expansion is not done, the process proceeds to Step 403, which starts the descend into the call graph. Step 403 marks the root node as the current node.

Step 404 checks whether the node is of type explored or inlined. In one or more embodiments, if the node is of type explored or inlined, the process proceeds to Step 405. In one or more embodiments, if the node is not of type explored or inlined, the process proceeds to Step 406.

In one or more embodiments, step 405 assigns the new current node as child of current node with the greatest expansion priority value. Upon completion of Step 405, the process proceeds back to Step 404.

In one or more embodiments, the benefit value is calculated as a function of frequency of the number of times a method is called by the root method, the number of optimizations triggered by the improved call-site arguments (which is determined by the expansion policy, for nodes of type C, G, D, E), and a function of probability of the respective child and the local benefit value, for nodes type I. The benefit can be estimated with, but not limited to, the expression $f*(1+Ns)$, where f is the frequency with which the cutoff node is called in the program, and Ns is the number of its parameters that can potentially trigger optimizations after inlining. The cost value is calculated as a function of the bytecode size for nodes type C; infinite for nodes type G; 0 for nodes type D; the size of the intermediate representation for nodes type E; and the sum of the cost value of the children of the root node for nodes type I.

Step 406 replaces the node with the node expansion. Step 407 records the optimization. In one or more embodiments, Step 407 records the optimizations triggered in the call graph by expanding the cutoff node. Finally, Step 408 updates the priority queue.

Figure 5:
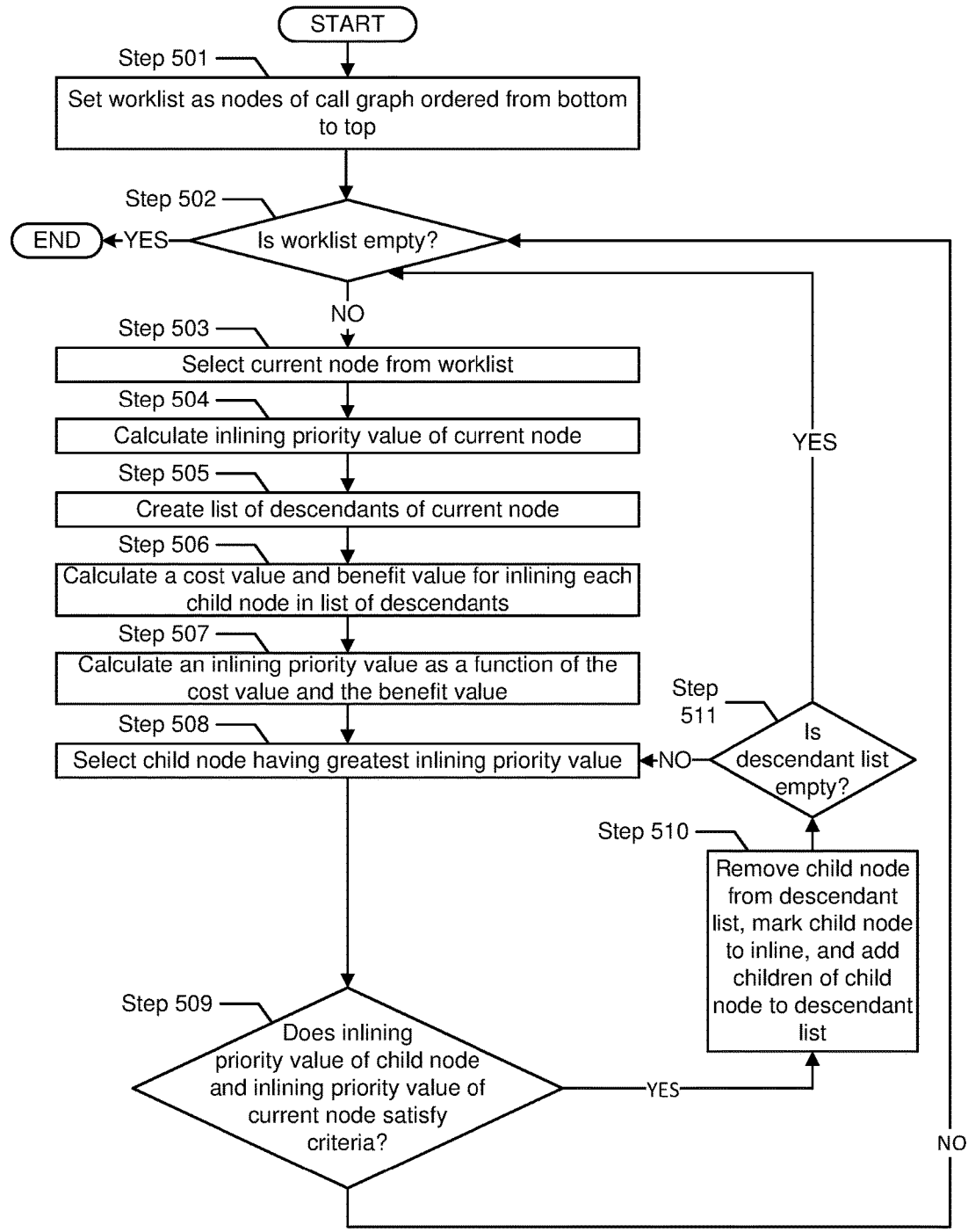

FIG. 5 shows the analysis part of one or more embodiments of the invention. Any of the steps shown in FIG. 5 may be designed to be executed by the compiler. Initially, step 501 sets the worklist as nodes of the call graph ordered from bottom to top. During the analysis part of one or more embodiments, nodes are assigned cost-benefit tuples. The merged cost-benefit tuple models the cumulative benefit and cost obtained by inlining one call-site into another. The analysis is done in the 'analyze' subroutine. The cost-benefit analysis proceeds bottom-up. First, the child nodes are analyzed. After these calls complete, the following invariants hold for each child node m: (1) some connected subgraph B below m has the nodes with inlined set to true. Being set to true indicates that if in were the root method, these descendants would be inlined into m; (2) the tuple in m is set to the benefit and cost of inlining the subgraph B into m. The subgraph B is heuristically chosen in a way such that its inlining maximally improves the benefit per cost of the method m. Inlining some subset of the subgraph B may improve the benefit per cost less, or even decrease it. More details regarding the analysis are shown and provided in regard to FIG. 7G and FIG. 7H.

Step 502 checks whether the worklist is empty. In one or more embodiments, if the worklist is empty then the process proceeds to END. Otherwise, if the worklist is not empty, then the process proceeds to Step 503. Step 503 selects the current node from the worklist.

Step 504 calculates the inlining priority value of the current node. Step 505 creates list of descendants of current node. Child nodes are put in a list, where the child nodes with the highest benefit-cost ratio are repetitively removed in a loop, while the other children are left in the list.

Step 506 calculates the cost value and benefit value for inlining each child node in list of descendants. The cost value is calculated as a function of the bytecode size for nodes type C; infinite for nodes type G; 0 for nodes type D; the size of the intermediate representation for nodes type E; and the sum of the cost value of the children of the root node for nodes type I. The benefit value is calculated as a function of frequency of the number of times a method is called by the root method, the number of optimizations triggered by the improved call-site arguments, which is determined by the expansion policy, for nodes of type C, G, D, E; a function of probability of the respective child and the local benefit value for nodes type I.

Step 507 calculates an inlining priority value as a function of the cost value and the benefit value. Step 508 selects child node having greatest inlining priority value. Such use of priority values based on cost value and benefit value is important to one or more embodiments of the invention.

In Step 509 the inlining priority value of child node and inlining priority value of current node is checked to determine whether the criteria is satisfied. In one or more embodiments, if the inlining priority value of child node and inlining priority value of current node satisfy criteria, then the process proceeds to Step 510. In one or more embodiments, if inlining priority value of child node and inlining priority value of current node does not satisfy criteria, then the process proceeds to Step 502.

In one or more embodiments, Step 510 removes child node from descendant list, marks child node to inline, and adds children of child node to descendant list.

Step 511 checks whether the descendant list is empty. In one or more embodiments, if the descendant list is empty, then the process proceeds to Step 502. In one or more embodiments, if the descendant list is not empty, then the process proceeds to Step 508. The inline priority value is calculated as a function of the local benefit, and the cost of inlining the node and of a reduced priority penalty. The calculation of the local benefit and the cost of inlining the node has been described above and the same methodology is used here. The priority penalty is a function of the size of the intermediate representation of the nodes, the size of the bytecode, and several empirically determined constants.

Figure 6:
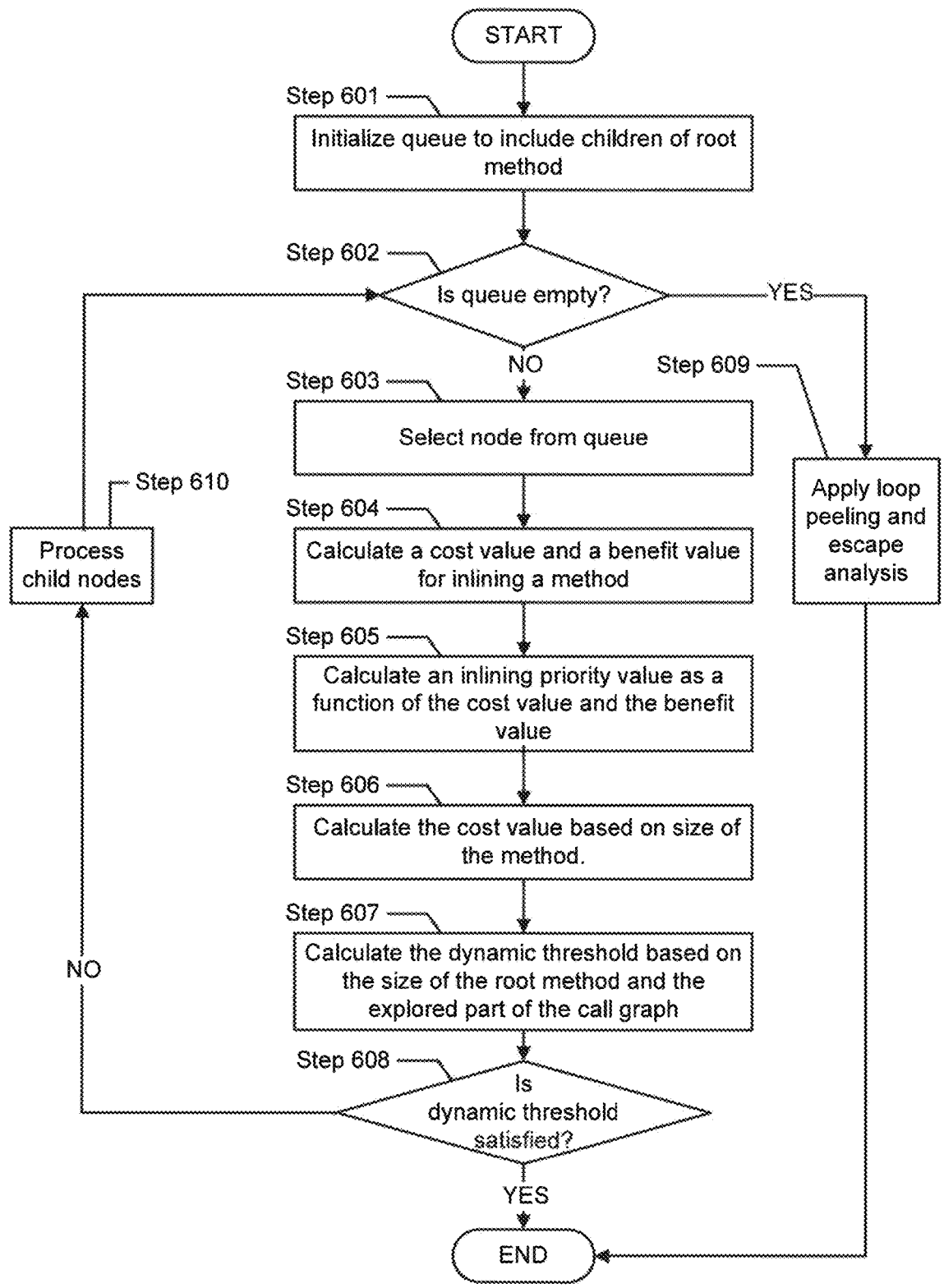

FIG. 6 shows the inlining part of one or more embodiments of the invention. Any of the steps shown in FIG. 6 may be designed to be executed by the compiler. In Step 601, the queue is initialized to include children of root method.

Step 602 checks whether the queue is empty. In one or more embodiments, if the queue is empty, then the process proceeds to Step 609. In one or more embodiments, if the queue is not empty, then the process proceeds to Step 603. Step 603 selects node from queue.

Step 604 computes a cost value and a benefit value for inlining a method. In one or more embodiments, the cost of expanded nodes is based on the sum of the costs of the children that were previously marked inlined during the analysis part. Similarly, in one or more embodiments, the benefit of expanded nodes is based on the sum of the benefits of inlining the children that were previously marked inlined during the analysis part. The combination of inlining and expansion in this manner is an important improvement, whose goal is to model the inlining decisions that each call graph node would make if it were the root compilation unit, and henceforth to decide whether it is more optimal to inline those methods into the callsite, or to compile them separately. Likewise, so is the use of iterative expansion and inlining of methods. In one or more embodiments, the cost of inlined nodes is based on the size of the intermediate representation for the expanded nodes.

Step 605 computes an inlining priority value as a function of the cost value and benefit value. Step 606 computes the cost value of the root method based on the size of the method.

Step 607 calculates the dynamic threshold based on the size of the root method and the explored part of the call graph. The use of dynamic threshold to process nodes in the call graph is an important improvement. In Step 608 the dynamic threshold is evaluated to determine whether it is satisfied. The dynamic threshold can be computed as, but not limited to, the value $e^{((root\text{-}size-C1)/C2)}$, where root-size is the size of the root method, and C1 and C2 are empirically derived constants. In one or more embodiments of the invention, if the dynamic threshold is satisfied, then the process proceeds to END. In one or more embodiments, if the queue is not empty, then the process proceeds to Step 610.

Step 609 applies loop peeling and escape analysis. Finally, step 610 processes child nodes.

FIGS. 7A, 7B, 7C, 7D, 7E, 7F, 7G, and 7H show examples of calculating priorities as well as managing the call graph data structure.

Figures 7A, 7B:
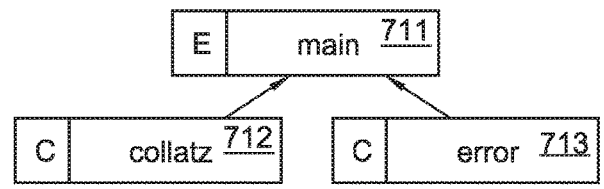
FIGS. 7A, 7B, 7C, 7D, 7E, 7F, 7G, and 7H show examples in accordance with one or more embodiments of the invention.

FIG. 7A shows example source code (700) that is analyzed in the example shown in FIGS. 7B, 7C, 7D, 7E, 7F, 7G, and 7H. In particular, lines 1-3 of the example source code are code for the half function. Lines 5-14 of the example source code (700) are code for the collatz function. Lines 16-20 of the example source code (700) are code for the main function. FIG. 7B shows, in one or more embodiments of the invention, the initial call graph for a main function (711), labeled E since it an explored node, representing a call to a function whose body has been explored. The main function calls the collatz and error functions. In one or more embodiments the methods collatz (712) and error (713) are, before inlining starts, labeled C for cutoff nodes, since they are functions whose bodies have not been explored yet. The arrows pointing to main show that collatz (712) and error (713) are the children nodes of main (711).

Figure 7C:
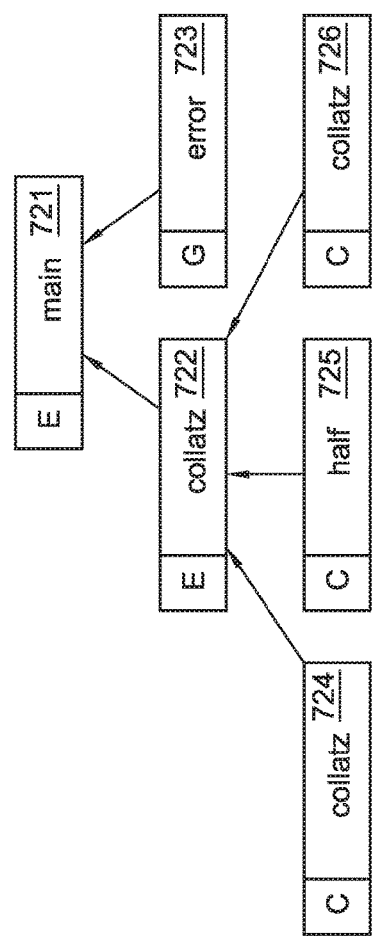

FIG. 7C shows, in one or more embodiments, the call graph structure after main (721), collatz (712) and error (713) from FIG. 7B have been explored. In FIG. 7C, in one or more embodiments, exploration has generated another collatz (724) method, a half (725) method, and a second collatz (726) method. In one or more embodiments, the old collatz (722) method has been labeled E since the method has been explored, the error (723) method has been labeled G for generic, since the inlining procedure could not determine a concrete target, so the method was replaced with this generic node. In one or more embodiments, the new nodes, the two collatz methods (724, 726) and the half (725) methods are labeled C for cutoff nodes because the methods are functions whose bodies have not been explored yet. The call graph structure is built up, and later the cost-benefit analysis is applied to see how to improve the call graph.

Figure 7D:
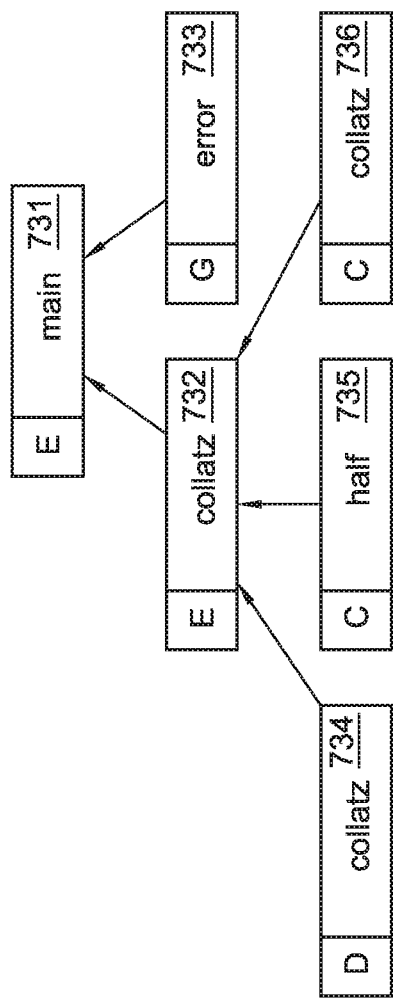

FIG. 7D shows, in one or more embodiments, the outcome after the inlining procedure has been applied to FIG. 7C, starting with main (731). In one or more embodiments, a deleted node, denoted with D, which represents a call-site that was originally in the intermediate representation, is removed by an optimization. Continuing with FIG. 7D, in one or more embodiments, the inlining algorithm propagates the concrete call-site arguments into the body of the first collatz (732) call, and triggers an optimization. Consequently, in one or more embodiments, the if-cascade in the collatz (736) body is optimized away, and the first recursive call to collatz (734) is removed. error (733) is labeled with G, half (735) is labelled as cutoff C, as is the second collatz (736).

Figure 7E:
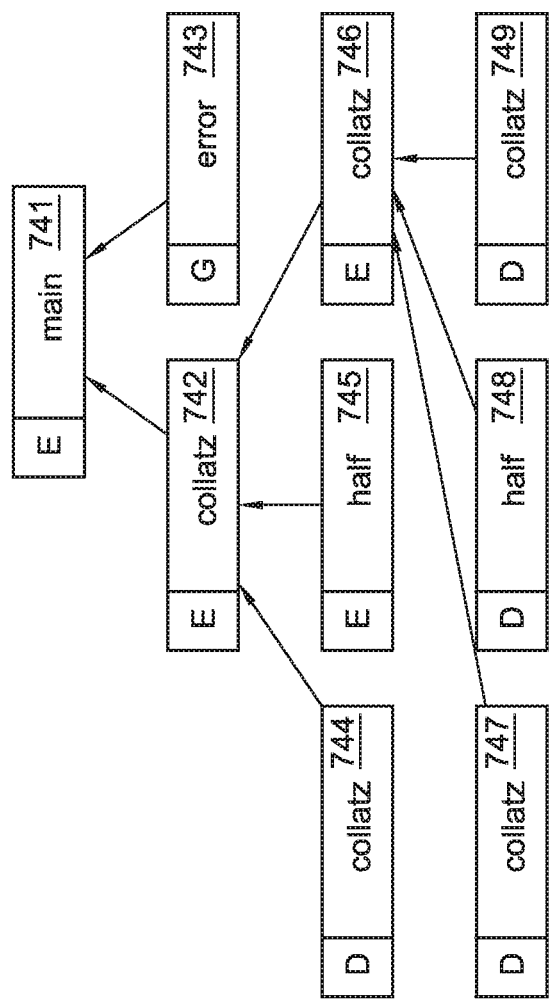

FIG. 7E shows, in one or more embodiments, the state after the inlining procedure has been applied to FIG. 7D. In one or more embodiments of the invention, several more nodes (744, 747, 748, 749) have been labeled as deleted nodes, denoted with D, while the explored nodes (741, 742, 745, 746) have been labeled E. The error node (743) has been labeled generic, G. Although more nodes are generated to explore, several of the nodes (744, 747, 748, 749) will be deleted. This is an example of how more opportunities are found for call graph expansion which were not known to exist at the beginning of the process. Accordingly, more opportunities for optimization exist.

Figure 7F:
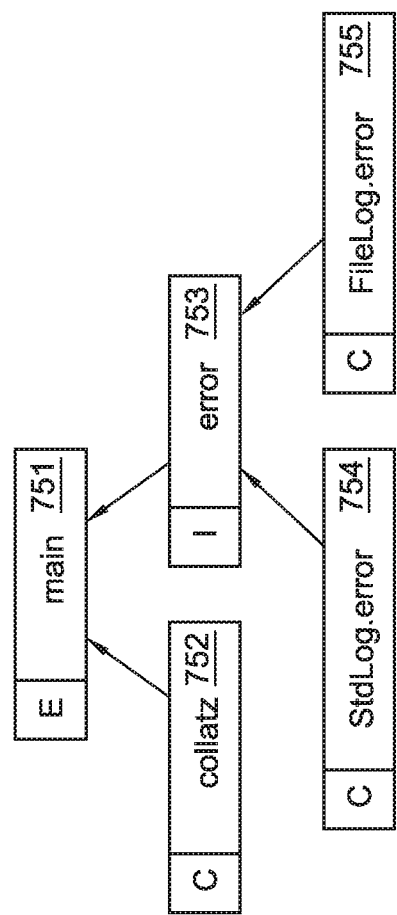

FIG. 7F shows that in one or more embodiments of the invention, the compiler may alternatively conclude that the only implementations of the error method (753) are in the StdLog (754) and FileLog (755) classes, and create an inline cache node with the respective children, and label those methods C (cutoff) and the error node (753) as I (inlined). The main node (751) is labeled E (explored), while the collatz node (752) is labeled C (cutoff).

Figure 7G:
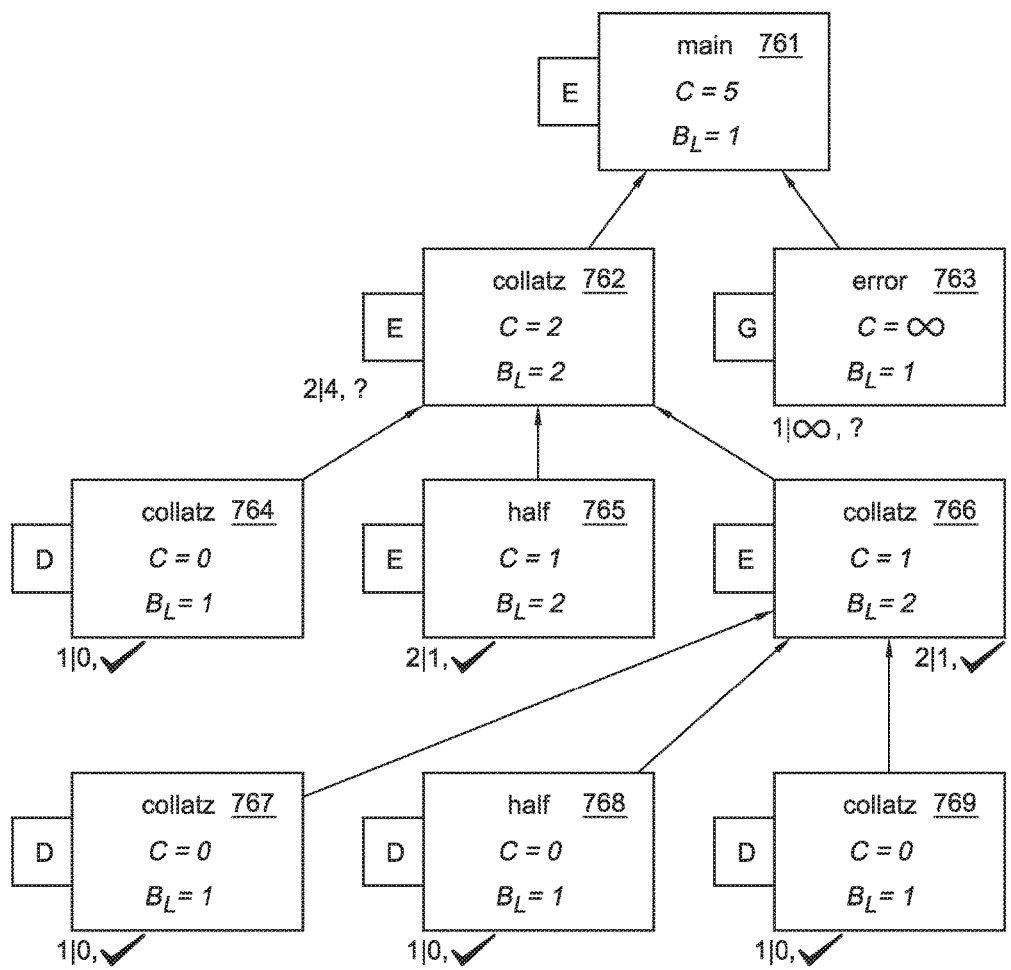
Figure 7H:
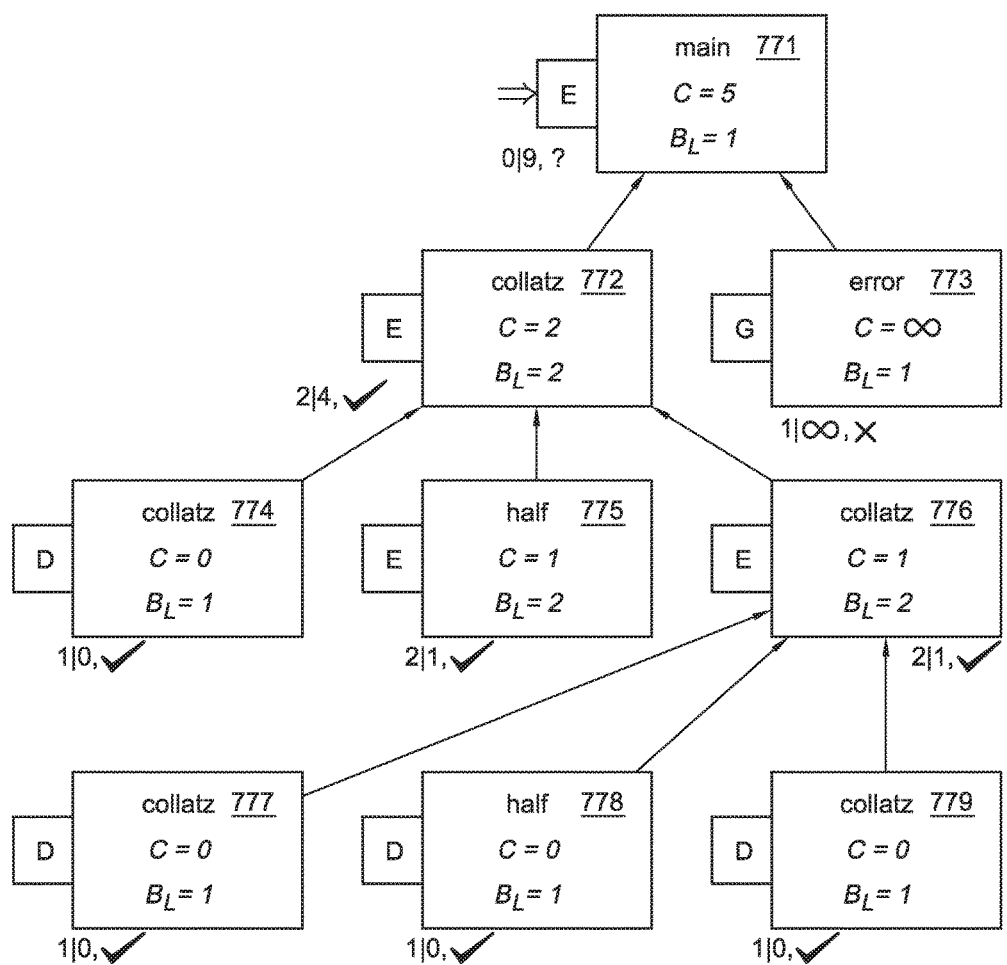

FIGS. 7G and 7H show, in one or more embodiments, the analysis part of the invention. The currently considered node is main (761) at depth 0, marked with an arrow. Each child node at depth 1 is analyzed—the collatz (762) on the left has the benefit|cost 2|4, and the generic error call on the right has the benefit|cost 1|inifinite. In addition, the analysis concludes that the subgraph B of collatz (762) (namely, the nodes half (765) and collatz (764, 766) at depth 2) must be inlined together, because the arguments from the first collatz (762) considerably simplify the half node (765) and the second collatz node (766). The child node error (763) is labeled generic, G, with B_L|C values of 1|infinity. The child nodes collatz (767), half (777), collatz (778) are labeled for deletion, D, with B_L|C values of 1|0. The analysis part of the invention allows a decision to be made which nodes to keep and which to delete, based on the cost-benefit calculations.

The initial benefit B_I is calculated using the local benefit and the benefit of the child nodes present. With the initial benefit B_I, the benefit is modeled from inlining n, and the fact that no benefits from inlining the children of n has yet occurred. For most nodes, the initial benefit B_I is a negative value. For example, the B_I for the main method in FIG. 7G is B_I=1−2−1=−2.

FIGS. 7G and 7H show, in one or more embodiments, the values of the analysis of some methods. The initial cost benefit tuple is B_I(main)|C(main)=−2|5. The best child is collatz (762) with the tuple 2|4. The merged tuple is 0|9, which is better than −2|5, so the collatz (772) call is marked for inlining (see FIG. 7H). In the inlining stage, the collatz (774, 776) calls and half (775) calls at depth 2 are also inlined into main (771), since the calls are a part of the marked connected subgraph. The error (773) call is in this case generic, and cannot improve main further.

Figure 8A:
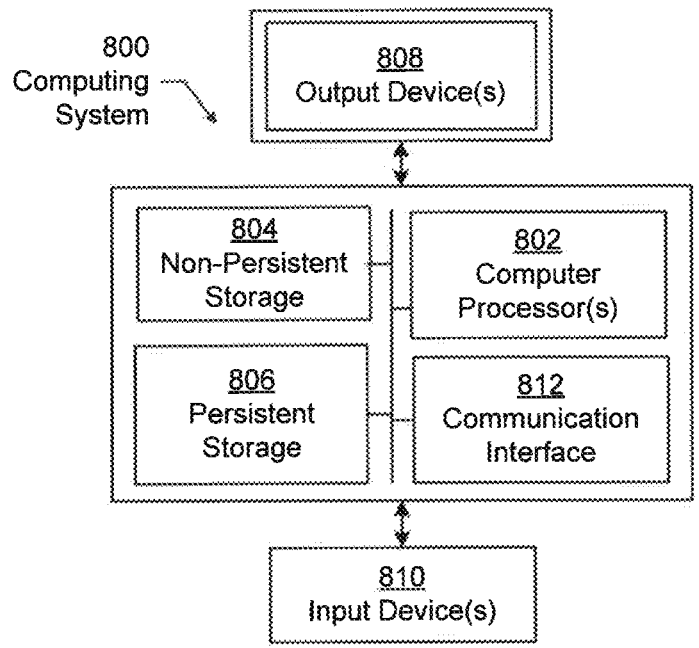
FIGS. 8A and 8B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
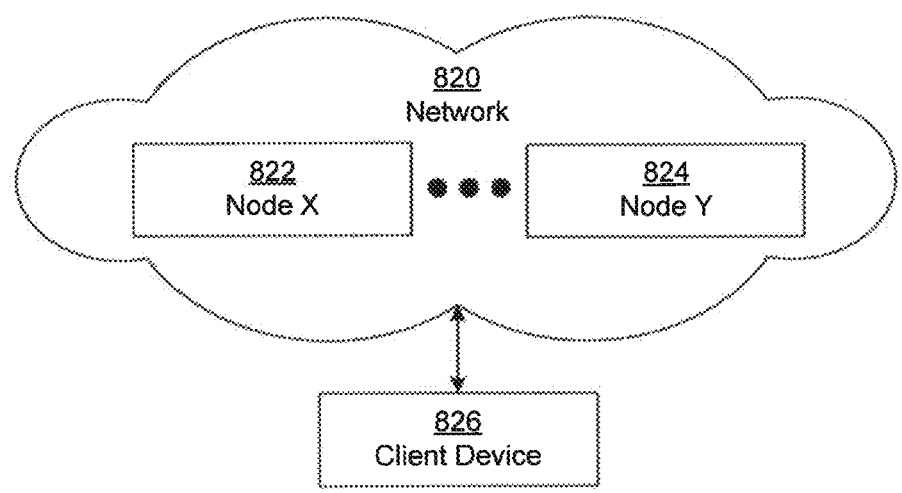

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether $A>B$, $A=B$, $A \ne B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing program execution of a program, the method implemented with a processor coupled with memory-stored executable compiler instructions which, when executed by the processor, perform the steps of optimizing method, comprising:
    performing, to obtain a first expanded call graph, a first expansion of an initial call graph, the first expanded call graph comprising a first plurality of nodes, the first initial call graph being defined for a program comprising a root method, a first child method, and a second child method;
    inlining, based on an analysis of the first expanded call graph, the first child method into the root method, the first child method corresponding to a node of the first plurality of nodes in the first expanded call graph;
    performing a first optimization operation in response to inlining the child method;
    updating the first expanded call graph based on the optimization operation to obtain an updated call graph;
    performing, to obtain a second expanded call graph, a second expansion of the updated call graph, the second expanded call graph comprising a second plurality of nodes;
    inlining, based on an analysis of the second expanded call graph, the second child method into the root method, the second child method corresponding to a node of the second plurality of nodes in the second expanded call graph; and completing compilation of the program.

2. The method of claim 1, further comprising:
    inlining, based on an analysis of the first expanded call graph indicating simultaneously inlining, a plurality of methods into the root method simultaneously, the plurality of methods comprising the first child method.

3. The method of claim 1, wherein performing the first optimization operation comprises:
    propagating, through the first expanded call graph, information about at least one selected from a group consisting of an argument of an optimized call site and a return value of the optimized call site.

4. The method of claim 3, wherein propagating the information is performed recursively.

5. The method of claim 1, further comprising, performing a second optimization operation in response to performing the second expansion of the updated call graph and prior to inlining the second child method.

6. The method of claim 1, further comprising:
    calculating a cost value and a benefit value for inlining the first child method;
    calculating a inlining priority value as a function of the cost value and the benefit value,
    comparing the inlining priority value to a dynamic threshold,
    wherein inlining the first child method is performed based on the dynamic threshold.

7. The method of claim 6, wherein the cost value is calculated as a size of a program representation of the node of the first plurality of nodes.

8. The method of claim 6, further comprising:
    calculating the dynamic threshold as a function of memory usage.

9. The method of claim 1, further comprising:
    calculating an expansion priority value for each of a plurality of child nodes of a parent node, the plurality of child nodes and the parent node in the first plurality of nodes;

selecting a child node from the plurality of child nodes based on the expansion priority value; and replacing a child node with an expanded child node to obtain the first expanded call graph.

10. The method of claim 9, wherein the child node is expanded based on the expansion priority value satisfying an expansion threshold, the expansion threshold is a function of a size of an intermediate representation of the call graph.

11. The method of claim 10, wherein the expansion threshold is changed to be a function of a size of an intermediate representation of the updated call graph when performing the second expansion.

12. The method of claim 9, further comprising:
calculating the expansion priority value for each of the first plurality of nodes; and
traversing, to perform the first expansion, the first plurality of nodes in order defined by the expansion priority value of each of the first plurality of nodes.

13. A system for optimizing program execution of a program, the system comprising:
memory;
computer processor configured to execute a compiler stored in memory, the compiler for causing the computer processor to:
perform, to obtain a first expanded call graph, a first expansion of an initial call graph, the first expanded call graph comprising a first plurality of nodes, the initial call graph being defined for a program comprising a root method, a first child method, and a second child method;
inline, based on an analysis of the first expanded call graph, the first child method into the root method, the first child method corresponding to a node of the first plurality of nodes in the first expanded call graph;
perform an optimization operation in response to inlining the child method;
update the first expanded call graph based on the optimization operation to obtain an updated call graph;
perform, to obtain a second expanded call graph, a second expansion of the updated call graph, the second expanded call graph comprising a second plurality of nodes;
inline, based on an analysis of the second expanded call graph, the second child method into the root method, the second child method corresponding to a node of the second plurality of nodes in the second expanded call graph; and
complete compilation of the program.

14. The system of claim 13, further comprising:
a data repository configured to store the initial call graph.

15. The system of claim 13, wherein the computer processor is further configured to execute a profiler configured to create the initial call graph.

16. A non-transitory computer readable medium for optimizing program execution of a program, the non-transitory computer readable medium comprising computer readable program code for:

performing, to obtain a first expanded call graph, a first expansion of an initial call graph, the first expanded call graph comprising a first plurality of nodes, the first initial call graph being defined for a program comprising a root method, a first child method, and a second child method;
inlining, based on an analysis of the first expanded call graph, the first child method into the root method, the first child method corresponding to a node of the first plurality of nodes in the first expanded call graph;
performing an optimization operation in response to inlining the child method;
updating the first expanded call graph based on the optimization operation to obtain an updated call graph;
performing, to obtain a second expanded call graph, a second expansion of the updated call graph, the second expanded call graph comprising a second plurality of nodes;
inlining, based on an analysis of the second expanded call graph, the second child method into the root method, the second child method corresponding to a node of the second plurality of nodes in the second expanded call graph; and
completing compilation of the program.

17. The non-transitory computer readable medium of claim 16, further comprising computer readable program code for:
inlining, based on an analysis of the first expanded call graph indicating simultaneously inlining, a plurality of methods into the root method simultaneously, the plurality of methods comprising the first child method.

18. The non-transitory computer readable medium of claim 16, wherein performing the first optimization operation comprises:
propagating, through the first expanded call graph, information about at least one selected from a group consisting of an argument of an optimized call site and a return value of the optimized call site.

19. The non-transitory computer readable medium of claim 16, further comprising computer readable program code for:
calculating a cost value and a benefit value for inlining the first child method;
calculating a inlining priority value as a function of the cost value and the benefit value,
comparing the inlining priority value to a dynamic threshold,
wherein inlining the first child method is performed based on the dynamic threshold.

20. The non-transitory computer readable medium of claim 19, further comprising computer readable program code for:
calculating the dynamic threshold as a function of memory usage.

* * * * *

UNITED STATES PATENT AND TRADEMARK OFFICE
CERTIFICATE OF CORRECTION

PATENT NO. : 10,261,765 B1
APPLICATION NO. : 15/917482
DATED : April 16, 2019
INVENTOR(S) : Aleksandar Prokopec et al.

It is certified that error appears in the above-identified patent and that said Letters Patent is hereby corrected as shown below:

On the Title Page

On page 2, item (56) under OTHER PUBLICATIONS, occurring in the first reference citied, Line 4, "Beidelberg" should read -- Heidelberg --.

Signed and Sealed this
Twenty-first Day of April, 2020

Andrei Iancu
*Director of the United States Patent and Trademark Office*